United States Patent [19]
Davies et al.

[11] 3,869,878
[45] Mar. 11, 1975

[54] UNIVERSAL JOINTS

[75] Inventors: John Hazlewood Davies, Barton-under-Needwood near Burton-on-Trent; Bertram Joseph Palmer, Barton-under-Needwood nr. Burton-on-Trent; Leslie George Fisher, Birmingham, all of England

[73] Assignee: GKN Transmissions Limited, Birmingham, England

[22] Filed: Mar. 30, 1973

[21] Appl. No.: 346,268

[30] Foreign Application Priority Data
Mar. 30, 1972 Great Britain.................... 14972/72

[52] U.S. Cl.............................. 64/8, 64/4, 64/1 C, 64/21
[51] Int. Cl............................................. F16d 3/02
[58] Field of Search............... 64/21, 8, 7, 17, 23, 6, 64/4, 1 C

[56] References Cited
UNITED STATES PATENTS

| | | | |
|---|---|---|---|
| 2,685,784 | 8/1954 | Wildhaber................................. | 64/8 |
| 3,362,193 | 1/1968 | Ritsena..................................... | 64/21 |
| 3,656,318 | 4/1972 | Smith et al............................... | 64/21 |
| 3,688,521 | 9/1972 | Smith et al............................... | 64/21 |

Primary Examiner—Samuel Scott
Assistant Examiner—Randall Heald
Attorney, Agent, or Firm—Spencer & Kaye

[57] ABSTRACT

In a universal joint of the kind comprising an outer member having a side wall defining an axial bore and an end wall closing one end of said bore, an inner member disposed in said bore, and torque-transmitting means operatively connecting together the two members internally of said bore such that the members are movable angularly relative to one another whilst permitting a continuous torque-transmission between the members, the outer member comprises a machined main component constituting the side wall of said member and an initially separate element constituting the end wall of said member, said element being a sheet metal pressing which is thin-walled compared with the main component. The end wall element has an axially projecting peripheral flange which is secured to the main component, and an outwardly projecting spigot formation coaxial with the bore of the main component and for engagement in an end portion of a tubular drive shaft. The spigot formation may be constituted by an extension of the flange or, if the formation is of a smaller diameter than the flange, joined to the flange by an annular portion of the element.

11 Claims, 1 Drawing Figure

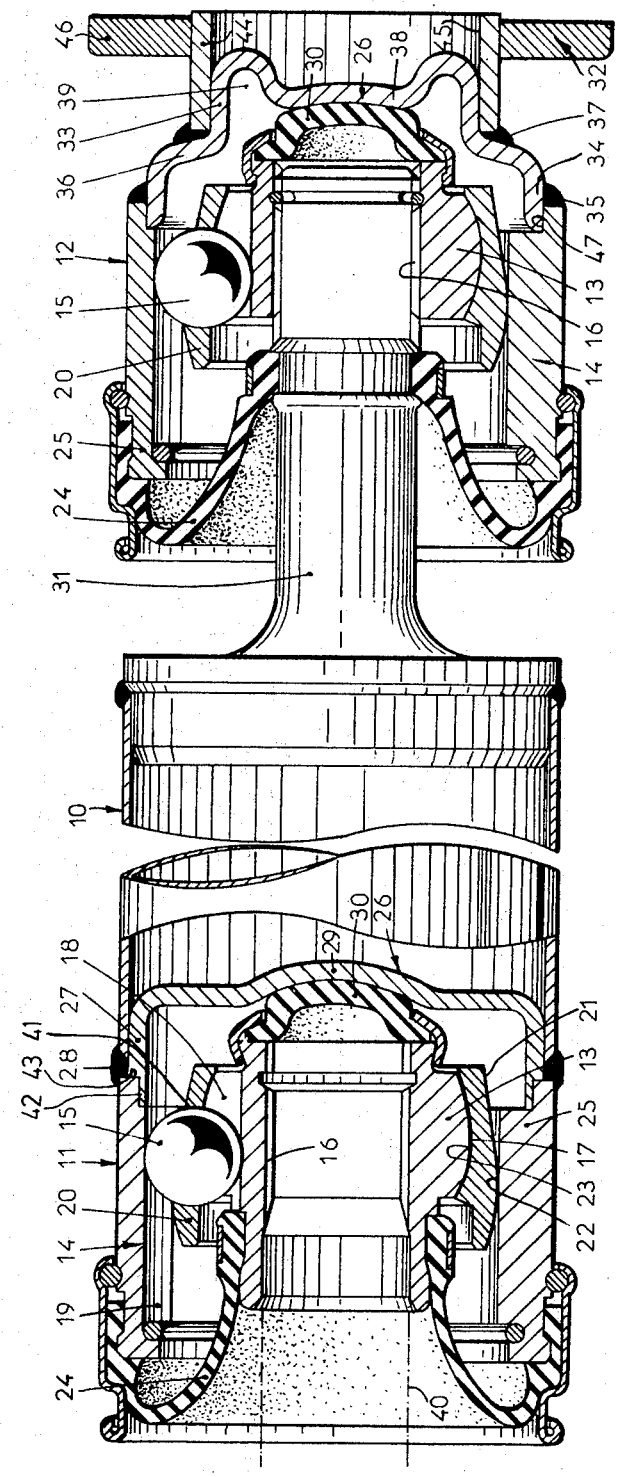

UNIVERSAL JOINTS

BACKGROUND OF THE INVENTION

This invention relates to universal joints of the kind comprising an outer member having an axial bore which is defined by a side wall and is closed at one end by an end wall, an inner member disposed in said bore, and torque-transmitting means operatively connecting together the two members internally of said bore such that the members are movable angularly relative to one another whilst permitting a continuous torque-transmission between the members. Such a joint is hereinafter referred to as a universal joint of the kind specified.

One of the problems which arises in the manufacture of transmission assemblies incorporating universal joints of the kind specified is that the outer members of the joints are required to be connected to tubular drive shafts of different diameters, the diameter of a drive shaft being determined in accordance with the maximum rotational speed at which it is to operate and the effective length of the shaft. The outer members of conventional joints are made of correspondingly differing diameters to cater for this requirement and this adds to the manufacturing costs.

It is an object of the present invention to provide a universal joint construction which enables joints for fitting to tubular drive shafts of different diameters to be produced more economically than has hitherto been possible.

SUMMARY OF THE INVENTION

According to a first aspect of the invention we provide a universal joint of the kind specified in which the outer member comprises a main component constituting the side wall thereof and an initially separate element constituting the end wall thereof and secured to the main component, said element presenting an outwardly projecting spigot formation coaxial with the bore of the member and for engagement in an end portion of a tubular drive shaft.

By adopting this construction a manufacturer can produce a range of universal joints of the same size but which can be fitted to tubular drive shafts of different diameters. Thus, the manufacturer can use for the outer members of the joints main components of a common design with bores of the same diameter and end wall elements having spigot formations of different diameters. The only parts of the joints which have to be varied to cater for drive shafts of different diameters are the end wall elements and these can be produced relatively cheaply.

Preferably, the end wall element of the outer member is formed as a sheet metal pressing. Thus, the element can be made thin-walled compared with the main component which will usually be formed by machining.

According to a further aspect of the invention there is provided for a universal joint of the kind specified an outer member comprising a machined main component constituting the side wall thereof and an initially separate element constituting the end wall thereof and secured to the main component, said element being formed as a sheet metal pressing which is thin-walled compared with the main component, and presenting an outwardly projecting spigot formation coaxial with the bore of the member.

The invention has been devised primarily in connection with universal joints having constant velocity characteristics and in which the torque-transmitting means comprise balls engaged in and between pairs of opposed grooves formed in the internal circumferential surface of the bore of the outer member and in the external surface of the inner member, and means are provided for assisting in positioning the balls in the bisector plane of the joint when relative angular displacement occurs between the two members. In this regard the invention is applicable both to plunging constant velocity joints wherein provision is made for relative axial movement between the inner and outer members and to constant velocity joints of the non-plunging type.

When the invention is applied to a constant velocity universal joint of the kind specified the grooves of the outer member will be formed by machining the internal surface of the main component. Thus, the relatively expensive operation of forming the grooves is confined to that part of the joint which can be mass produced without taking into account drive shaft diameters. Moreover, since the main component is of open-ended tubular form, the grooves can be formed accurately, e.g. by broaching. In this regard it is important in constant velocity universal joints that the effective diameter measured between the points of contact of the balls with diametrically opposed grooves is constant over the whole length of the grooves.

Preferably the end wall element has a peripheral attachment formation which interfits axially with an attachment formation provided on the main component with a welded union between the said formations.

With regard to the welding together of the two parts of the outer joint member, an advantage of making the end wall element thinner than the main component is that the element is sufficiently flexible to accommodate any dimensional changes which occur to different extents in the two parts when they cool after the welded junction has been made. The rates of heat flow into the two parts of the outer member from the welding zone may differ and if the end wall were thicker and more rigid and the welded junction were established whilst there is a difference of temperature between the parts, when the temperatures are equalised the end wall would cause inward contraction of the adjacent portion of the side wall and consequent distortion of the grooves for the torque-transmitting balls.

Preferably the attachment formation of the main component is an internal rebate formed at one end thereof and the attachment formation of the end wall element is an axially projecting peripheral flange which fits inside the rebate to form an external corner for reception of a welding fillet. Thus, the adjacent surfaces of the two parts of the outer joint member which are to be welded together, are disposed generally perpendicular to one another around the member and are positioned conveniently for welding, for example by means of arc welding using a rod electrode.

Moreover, the location of the said surfaces is such that the site of the welded junction is as far away as possible from the grooves of the outer member in which the torque-transmitting balls engage, this further minimising distortion of the grooves during the formation of the weld.

The use of an interfitting flange and rebate also facilitates a quick and accurate axial alignment of the two parts of the outer member prior to welding and assists in maintaining such alignment in the finished joint.

Depending on the diameter of the spigot formation compared with the diameter of the peripheral flange, the end wall element may include an annular portion interconnecting the peripheral flange and the spigot formation. Where the spigot formation is of a diameter smaller than that of the peripheral flange, the end wall element will include such an annular portion. In this case a tubular drive shaft fitted to the spigot formation will abut said annular portion and may be secured to the outer member by means of a welding fillet formed in the corner between the shaft and the said portion. Where the spigot formation is of the same diameter as the peripheral flange it will be constituted by an extension of the latter. In this case the drive shaft may be secured to the outer member by means of a weld at the location of the weld between the attachment formations of the two parts of the outer member. It is to be noted that the use of a spigot formation ensures that the shaft is kept in axial alignment with the outer member of the joint.

Where the joint is a plunging constant velocity joint as described above and in which the balls are located in a cage, the end wall element may include an annular outwardly projecting part defining internally of the outer member a clearance for the cage as it and the inner member move axially and angularly relative to the outer member. In addition, the centre portion of the spigot formation may be formed to co-operate, on relative axial movement in one direction between the inner member and the outer member, with a stop element provided on the inner member thereby to limit the extent of such movement. Where the joint is fitted to one end of a drive shaft having another plunging joint of a similar construction at its other end, axial movement in the opposite direction between the inner and outer members of the joint is limited by the stop element of said other joint.

It will be noted that the main component of the outer member of a constant velocity joint embodying the invention must be of relatively thick walled form having regard to its torque-transmitting requirements and also to permit of the inclusion in its sectional thickness of the grooves to receive the torque-transmitting balls, whereas the end wall element of the outer member can be made of a construction which is lighter whilst being sufficient to transmit maximum torque to the drive shaft and to withstand impact by the stop element without deformation.

BRIEF DESCRIPTION OF THE DRAWINGS

The invention will now be described, by way of example, with reference to the accompanying drawing which is a side view, partly in longitudinal section, of a transmission assembly comprising a propellor shaft provided at the respective ends thereof with two forms of plunging constant velocity universal joint embodying the invention.

DESCRIPTION OF THE PREFERRED EMBODIMENT

In the drawing the propellor shaft which is of tubular form, is generally designated 10 and the two plunging constant velocity universal joints are generally designated 11 and 12 respectively.

The joint 11 basically comprises an inner member 13, an outer member 14 surrounding the inner member, and torque-transmitting balls 15 operatively connecting together the two members. The inner member 13 has a cylindrical bore formed with splines 16 for engagement with the splined end of a drive shaft shown in chain dotted lines at 40 which is inserted into the bore, and a part-spherical outer surface 17 formed with six angularly spaced longitudinal grooves 18. The outer member 14 has a cylindrical bore and is formed with six internal longitudinal grooves 19 each disposed opposite a groove 18 in the inner member. The balls 15 are engaged in and between the pairs of grooves 18, 19 so as to be operable to transmit torque between the inner and outer members 13 and 14 whilst permitting relative axial and angular movement between the members.

The balls 15 are located in apertures 41 in a cage 20 having a part-spherical outer surface 21 which engages the surface 22 of the cylindrical bore in the outer member 14, and a part-spherical inner surface 23 which engages the part-spherical surface 17 of the inner member 13. The inner surface 23 of the cage has a centre of curvature which, with the inner and outer members axially aligned, is disposed on the axis of the joint and is displaced from the centre of the joint, i.e. the point at which the plane containing the centres of the balls 15 intersects the joint axis, towards the outer end of the joint. The outer surface 21 of the cage has a centre of curvature which is also disposed on the joint axis but is off-set from the joint centre by an equal amount in the opposite direction. This off-set centre arrangement ensures that during joint articulation the centres of the balls 15 are always kept in the bisector plane of the joint.

Connected between the inner and outer members 13 and 14 at the outer end of the joint is a sealing element 24.

The outer member 14 of the joint comprises a relatively thick walled main component 25 constituting a side wall of the member and a relatively thin-walled element generally designated 26 secured to the main component 25 and constituting an inner end wall of the member. The grooves 19 of the outer member are formed wholly in the main component 25 by machining. The element 26 is formed as a sheet metal pressing and has a peripheral flange 27 which is formed at its free end with an external rebate 42 which fits inside an internal rebate 43 formed at the relevant end of the main component 25. The element 26 is secured to the component 25 by a welding fillet 28 formed in the corner defined by the surface of the said end of the component and the outer surface of the flange 27 of the element. The element 26 has a spigot formation of an external diameter equal to the internal diameter of the tubular propellor shaft 10. This diameter of the shaft 10 is in fact equal to the external diameter of the peripheral flange 27 of the element 26 and in this case the spigot formation is constituted by an extension of the flange. The relevant end portion of the shaft 10 fits closely over the spigot formation and is secured to the outer joint member 14 and to the element 26 by the welding fillet 28.

The centre portion 29 of the element 26 is shaped so that it co-operates with a resiliently deformable stop 30 attached to the inner member 13 of the joint on axial movement of the inner member relative to the outer member 14 in one direction, thereby to limit the extent of such movement.

The joint 12 is similar in construction to the joint 11 and like parts thereof are identified by the same reference numerals. The inner member 13 of the joint 12 receives a splined stub shaft 31 secured by welding to the relevant end of the propellor shaft 10. The outer member 14 of the joint is secured to a drive component generally designated 32 comprising a hollow cylindrical part 44 having a bore 45 therein, and an annular part 46 welded to the part 44. The diameter of the bore 45 is smaller than the internal diameter of the propellor shaft 10 and the only respect in which the joint 12 differs from the joint 11 is that the end wall element 26, which in this case is disposed at the outer end of the joint, is of a different form to suit the drive component 32.

In the joint 12 the end wall element 26 comprises a spigot formation 33 which is coaxial with the main component 14 of the outer joint member and has an external diameter equal to the diameter of the bore 45 in the drive component 32, and a peripheral flange 34 which interfits with an internal rebate 47 provided at the relevant end of the main component 14, a welding fillet 35 being formed in the corner defined by the surface of the said end of the component 14 and the outer surface of the flange 34 of the element 26 to secure the latter to the component. The spigot formation 33 and the peripheral flange 34 are interconnected by an integral annular portion 36 against which the adjacent end of the drive component 32 abuts, the component being secured to the element 26 by a welding fillet 37 formed in the corner defined by the cylindrical part 44 of the component and the annular portion 36 of the element.

The centre portion 38 of the element 26 is formed so that it co-operates with the resiliently deformable stop 30 carried by the inner joint member 13 on axial movement of the inner member relative to the outer joint member 14 in one direction, thereby to limit the extent of such movement.

Axial movement of the inner joint member 13 of each joint 11, 12 relative to the associated outer joint member 14 in a direction opposite to the direction of the said movement which is limited by the stop 30 of said joint, is limited by the stop 30 of the other joint coming into contact with the associated end wall element 26.

The element 26 of the joint 12 is formed with an annular outwardly projecting part defining internally of the outer member 14 a clearance 39 for the cage 20 as it and the inner member 13 move axially and angularly relative to the outer member 14.

The tubular propellor shaft 10 of the transmission assembly may be of a diameter smaller than that shown in the drawing. In this event the joint at the left hand end of the shaft, as viewed in the drawing, will differ from the joint 11 shown in the drawing only in that its outer member 14 will have an end wall element 26 similar to the end wall element 26 of the joint 12, i.e. provided with a spigot formation which is smaller in diameter than the peripheral flange of the element and is joined to the flange by an annular portion, the main component 14 being identical to that shown in the drawing.

We claim:

1. A universal joint comprising an outer member having a side wall defining an axial bore and an end wall closing one end of said bore, an inner member disposed in said bore, and torque-transmitting means operatively connecting together the two members internally of said bore such that the members are movable angularly relative to one another whilst permitting a continuous torque-transmission between the members, the outer member comprising a main component constituting the side wall of said member and an initially separate component constituting the end wall of said member and secured to the main component, said initially separate component presenting an outwardly projecting spigot formation coaxial with the bore of the member and for engagement in an end portion of a tubular drive shaft, wherein the main component has an internal rebate formed at one end thereof and the initially separate component has an axially projecting peripheral flange which fits inside the rebate and forms with the main component an external corner which receives a welding fillet securing the two components together.

2. A universal joint as claimed in claim 1 wherein the initially separate component of the outer member comprises an element which is thin-walled compared with the main component and is constituted by a sheet metal pressing and the main component is constituted by a machined element.

3. A universal joint as claimed in claim 1 wherein the spigot formation is of a diameter smaller than that of the peripheral flange, the initially separate component including an annular portion integrally interconnecting the flange and the spigot formation.

4. A universal joint as claimed in claim 3 which has a tubular drive shaft fitted to the spigot formation, wherein said shaft abuts the annular portion of the initially separate component and is secured to the outer member by means of a welding fillet formed in the corner between the shaft and said annular portion.

5. A universal joint as claimed in claim 1 wherein the spigot formation is of the same diameter as the peripheral flange and is constituted by an integral extension of the latter.

6. A universal joint as claimed in claim 5 which has a tubular drive shaft fitted to the spigot formation, wherein said shaft is secured to the outer member by means of a weld at the location of the welding fillet between the two components of the outer member.

7. A universal joint comprising an outer member having a side wall defining an axial bore and an end wall closing one end of said bore, an inner member disposed in said bore, and torque-transmitting means operatively connecting together the two members internally of said bore such that the members are movable angularly relative to one another whilst permitting a continuous torque-transmission between the members, the outer member comprising a machined main component constituting the side wall thereof and an initially separate component constituting the end wall thereof and secured to the main component, said initially separate component being a sheet metal pressing which is thin-walled compared with the main component and is formed with an outwardly projecting spigot formation coaxial with the bore of the member and for engagement in an end portion of a tubular drive shaft.

8. A constant velocity universal joint as claimed in claim 7 in which the torque-transmitting means comprise balls engaged in and between pairs of opposed grooves formed in the internal circumferential surface of the bore of the outer member and in the external surface of the inner member, and means are provided for assisting in positioning the balls in the bisector plane of the joint when relative angular displacement occurs between the two members, wherein the internal surface of the main component of the outer member is machined to form the grooves of the outer member.

9. A plunging constant velocity universal joint as claimed in claim 8 in which the torque-transmitting balls are located in a cage and provision is made for relative axial movement between the inner and outer members, wherein the end wall element includes an annular outwardly projecting part defining internally of the outer member a clearance for the cage as it and the inner member move axially and angularly relative to the outer member.

10. A plunging constant velocity universal joint as claimed in claim 8 wherein the centre portion of the spigot formation is formed to co-operate, on relative axial movement in one direction between the inner member and the outer member, with a stop element provided on the inner member thereby to limit the extent of such movement.

11. A propellor shaft and universal joint assembly comprising a tubular propellor shaft having a universal joint at each end thereof, wherein:

a. each universal joint comprises an outer member having a side wall defining an axial bore and an end wall closing one end of said bore, an inner member disposed in said bore, and torque-transmitting means operatively connecting together the two members internally of said bore such that the members are movable angularly relative to one another whilst permitting a continuous torque-transmission between the members, the outer member comprising a main component constituting the side wall of said member and an initially separate element constituting the end wall of said member and secured to the main component, said element presenting an outwardly projecting spigot formation coaxial with the bore of the member.

b. the spigot formation of one of the universal joints is engaged in and secured to one end portion of the tubular propellor shaft, the inner member of the other universal joint is connected to the other end portion of the propellor shaft and the spigot formation of said other universal joint is engaged in and secured to a tubular drive component having an internal diameter different from that of the propellor shaft, and c. the main components of the two universal joints are substantially identical whereas the end wall elements of the two joints have spigot formations of different diameters to suit the different diameters of the propellor shaft and the drive component.

* * * * *

UNITED STATES PATENT OFFICE
CERTIFICATE OF CORRECTION

PATENT NO. : 3,869,878
DATED : March 11th, 1975
INVENTOR(S) : John Hazlewood Davies et al It is certified that error appears in the above-identified patent and that said Letters Patent are hereby corrected as shown below:

In the heading of the patent, change the first inventor's residence from "Barton-under-Needwood near Burton-on-Trent" to --Pelsall--.

Signed and Sealed this sixth Day of January 1976

[SEAL]

Attest:

RUTH C. MASON
Attesting Officer

C. MARSHALL DANN
Commissioner of Patents and Trademarks